United States Patent Office 3,513,427
Patented May 19, 1970

---

3,513,427
INDICATORS
Kenneth Wheatley Prosser, Luton, and Raymond Oliver and John Bertram Neville Browne, Liverpool, England, assignors to The English Electric Company Limited, Strand, England, a British company
Filed June 17, 1968, Ser. No. 737,406
Claims priority, application Great Britain, June 21, 1967, 28,558/67
Int. Cl. H01h 85/30
U.S. Cl. 337—243          8 Claims

ABSTRACT OF THE DISCLOSURE

An open-circuit indicator, suitable for fuse-links etc., comprises an electrode arranged capacitively relative to at least one further electrode with an electroluminescent phosphor as dielectric.

---

This invention relates to indicators for indicating visually an open-circuit condition in an electric circuit.

According to the invention, such an indicator includes a pair of electrodes for connection in the circuit, each said electrode being disposed capacitively with respect to a common third electrode or to each other with an electroluminescent phosphor between the electrodes as dielectric, and at least part of the phosphor being arranged so as to be visible, so that on application of a sufficient voltage between the electrodes of said pair, the phosphor shall glow.

Where there is a common third electrode (which may be two separate electrodes connected in series) the indicator is effectively two capacitors in series.

The term "capacitively" as used herein is to be understood as signifying an arrangement in which the capacitance provided by the co-operating electrodes and phosphor dielectric is such as to cause the phosphor to glow when a particular voltage, for which the indicator is intended to be used, is applied between the electrodes of said pair.

The term "translucent" as used herein includes transparent.

The invention provides a visual indicator which has a particularly high impedance. This makes it especially suitable for use in conjunction with a fuse-link to show when the fuse-link has ruptured. The indicator may in this case be attached to the body of the fuse-link, or connected in the circuit separately from the fuse-link but in parallel with it. Other applications include indication of the state of a switch or pair of relay contacts. Many applications are possible of such a light source, the light emission level of which is comparatively low, in computers.

Figure 1:
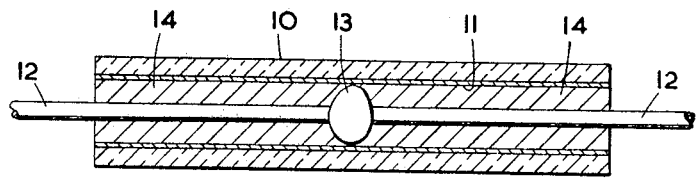
Figure 2:
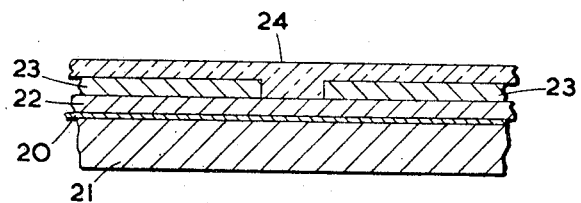
Figure 3:
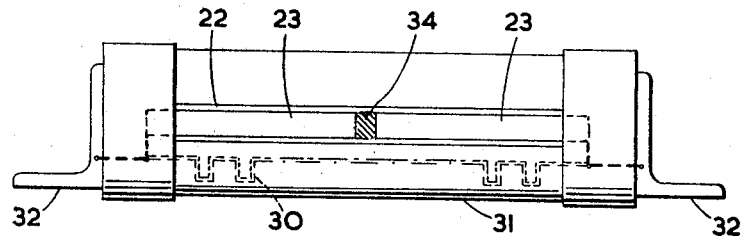

Embodiments of features of the invention will now be described by way of example and with reference to the accompanying drawings, of which:

FIGS. 1 and 2 are sectional views of indicators in two forms according to the invention; and FIG. 3 shows a cartridge-type fuse-link incorporating an indicator of the kind shown in FIG. 2.

The indicator in FIG. 1 comprises a glass tube 10 the bore of which is coated with a layer 11 of tin oxide and with a much thicker layer 14 of electroluminescent phosphor. Two copper wires 12, separated axially by a glass bead 13, are arranged coaxially in opposite ends of the tube 10. The wires are bonded, by a suitable electrically-conductive cement, to the phosphor 14. On the application of a voltage across the two electrodes 12, the phosphor 14 glows. The indicator is essentially two capacitors in series, of which the tin oxide layer 11 acts as a common electrode, the wires 12 being the other electrodes and the phosphor 14 acting as dielectric.

The tube 10 need not be of glass, but may be of any translucent electrically-insulating material, for example plastic. Not all of it need be translucent. The layer 11 may be of any suitable electrically-conductive material, as may the wires 12; and the bead 13 is only one possible method of insulating the wires 12 from each other: any suitable insulation may be provided here.

The same principle is applied in the flat strip-like indicator shown in FIGS. 2 and 3. In this case, a thin translucent electrically-conductive layer 20 (for example a vacuum-deposited metallic substance) is applied on a substrate 21, which may be of any suitable electrically-insulating material. An electroluminescent phosphor layer 22 is applied over the layer 20, and two flat electrically-conductive electrodes 23 are disposed in contact with the phosphor layer 22. The electrodes 23 may be vacuum-deposited and etched, or otherwise printed on; or they may be in the form of electrically-conductive strips fixed over the layer 22. The electrodes must be separated from each other by a gap, which may for example be about 1 mm. wide. A protective layer 24 of a suitable translucent substance (such as clear polyurethane lacquer or self-adhesive tape) is applied over the whole to give protection against the environment.

The electrodes 12 (FIG. 1) or 23 (FIG. 2) are arranged for connection in parallel with the part of the circuit in which an open-circuit condition is to be detected. In FIG. 3, for example, the electrodes 23 are connected to the two ends of the fusible element (indicated diagrammatically at 30) of a cartridge-type fuse-link having a ceramic body 31 which constitutes the substrate to which the layer 20 (FIG. 2), in strip form, is bonded. The fuse-link has terminals 32. If the element 30 is broken, then the phosphor layer 22 will glow, except for a small area, shaded at 34, between the ends of the electrodes 23. This condition then persists so long as there is a sufficient voltage between the terminals 32.

We claim:

1. An indicator arranged to indicate an open-circuit condition between two points in an electric circuit, between which two points a higher voltage occurs in said open-circuit condition than in a normal operating condition, said indicator including first and second electrodes for connection to said two points respectively; a third electrode; and an electroluminescent phosphor which forms a dielectric between said first and third electrodes and between said second and third electrodes to provide capacitive coupling between said first and second electrodes, said phosphor becoming luminescent when said higher voltage occurs thereby providing a visual indication of said open-circuit condition.

2. An indicator as claimed in claim 1, which includes a substrate formed of an electrically-insulating material, and in which said third electrode is formed as an electrically-conductive layer on said substrate, and the phosphor is formed as a layer over said third electrode.

3. An indicator as claimed in claim 2, in which said substrate, said electrodes and said phosphor are substantially flat layers.

4. An indicator as claimed in claim 3, including a coating of a translucent electrically insulating material to protect said layers.

5. An indicator as claimed in claim 2, in which said substrate is a translucent tube, in which said third electrode is formed as a translucent layer on the inside of said tube, and in which said first and second electrodes are arranged substantially end to end within said tube.

6. An indicator as claimed in claim 5, in which each of said first and second electrodes comprises a wire, said wires being arranged coaxially in opposite ends, respectively, of said tube and being separated by a bead of electricaly-insularing material.

7. An indicator as claimed in claim 1, arranged to indicate an open-circuit condition of a fusible element connected between said two points.

8. An indicator as claimed in claim 7, mounted on a cartridge fuse-link and arranged to indicate an open-circuit condition of the fusible element of said fuse-link.

References Cited

UNITED STATES PATENTS

| 2,702,329 | 2/1955 | Dietz et al. | 337—265 |
| 2,695,347 | 11/1954 | Brautigam | 337—243 |
| 1,314,583 | 9/1919 | Feldkamp | 337—243 |

BERNARD A. GILHEANY, Primary Examiner

D. M. MORGAN, Assistant Examiner

U.S. Cl. X.R.

337—266